US006984330B2

(12) United States Patent
Cushman et al.

(10) Patent No.: US 6,984,330 B2
(45) Date of Patent: Jan. 10, 2006

(54) USE OF OZONE FOR CONTROLLING GROWTH OF ORGANISMS

(75) Inventors: Michael Cushman, Punta Gorda, FL (US); Richard H. Pierce, Sarasota, FL (US)

(73) Assignee: Mote Marine Laboratory, Sarasota, FL (US)

(*) Notice: Subject to any disclaimer, the term of this patent is extended or adjusted under 35 U.S.C. 154(b) by 36 days.

(21) Appl. No.: 10/884,664

(22) Filed: Jul. 2, 2004

(65) Prior Publication Data

US 2005/0006316 A1 Jan. 13, 2005

Related U.S. Application Data

(60) Provisional application No. 60/485,274, filed on Jul. 7, 2003.

(51) Int. Cl.
*C02F 1/78* (2006.01)

(52) U.S. Cl. .................................... 210/760; 210/764

(58) Field of Classification Search ................ 210/760, 210/764

See application file for complete search history.

(56) References Cited

U.S. PATENT DOCUMENTS

| | | | | |
|---|---|---|---|---|
| 5,695,635 | A * | 12/1997 | Sasaki et al. | 210/188 |
| 6,125,778 | A * | 10/2000 | Rodden | 114/74 R |
| 6,235,206 | B1 | 5/2001 | Chan et al. | |
| 6,474,264 | B1 * | 11/2002 | Grimberg et al. | 119/231 |
| 6,869,540 | B2 * | 3/2005 | Robinson et al. | 210/760 |
| 6,902,678 | B2 * | 6/2005 | Tipton | 210/748 |

OTHER PUBLICATIONS

Blogoslawski, WJ, FP Thurberg, MA Dawson, and MJ Beckage, Field studies on ozone inactivation of a Gymnodinium breve toxin, Environmental Letters, 1975, pp. 209-215, vol. 9, Marcel Dekker, Inc.

Blogoslawski, WJ, FP Thurberg, and MA Dawson, Ozone inactivation of a Gymnodinium breve toxin, Water Research, 1973, pp. 1701-1703, vol. 7, Elsevier Science Ltd, Great Britain.

Grguric, G, JH, tREFRY, and JJ Kaeffaber, Ozonation products of bromine and chlorine in seawater aquaria, Water Research, 1994, pp. 1087-1094, vol. 28, Elsevier Science Ltd., Great Britain.

Pierce, RH, and GJ Kirkpatrick, Innovative techniques for harmful algal toxin analysis, Environmental Toxicology and Chemistry, 2001, pp. 107-114, vol. 20, SETAC Press, USA.

(Continued)

*Primary Examiner*—Betsey Morrison Hoey
(74) *Attorney, Agent, or Firm*—Catherine J. Walsh; Cecilia A. Walsh

(57) ABSTRACT

The present invention describes a method for controlling growth of harmful algal blooms generated by the red tide organism, *Karenia brevis*, and other harmful algal species. The method includes the steps of applying seawater containing low levels of dissolved ozone directly onto or under the surface of water containing harmful algal blooms. Since only low levels of ozone are required for this method to be effective and since the application of ozonated seawater is directed to the bloom itself, release of excess ozone into the atmosphere and/or surrounding water is minimal, which is advantageous since it greatly reduces adverse effects of ozone on the environment, marine life, and human health. The low concentration of ozone utilized in this method is sufficient to destroy the red tide organism, but leave surrounding marine life unharmed.

18 Claims, 3 Drawing Sheets

OTHER PUBLICATIONS

Rischbieter, E, H Stein, and A Schumpe, Ozone solubilities in water and aqueous salt solutions, Journal of Chemical and Engineering Data, 2000, pp. 338-340, vol. 45, ACS, USA.

Schneider, KR, RH Pierce, and GE Rodrick, The degradation of Karenia brevis toxins utilizing ozonated seawater, Harmful Algae, 2003, pp. 101-107, vol. 2, Elsevier Science, GB.

Williams, PM, RJ Baldwin, and KJ Robertson, Ozonation of seawater, Preliminary observations on the oxidation of bromie, chloride and organic carbon, Water Research, 1978, Elsevier Science Ltd., Great Britain.

* cited by examiner

USE OF OZONE FOR CONTROLLING GROWTH OF ORGANISMS

CROSS-REFERENCE TO RELATED APPLICATIONS

This application is an application under 35 USC 111(a) and claims priority under 35 USC 119 from Provisional Application Ser. No. 60/485,274, filed Jul. 7, 2003 under 35 USC 111(b). The disclosure of that provisional application is incorporated herein by reference.

BACKGROUND OF THE INVENTION

1. Field of the Invention

This invention relates to methods for controlling growth of harmful organisms in water, particularly algae blooms generated by red tide organisms.

2. Introduction to the Invention

Red tide blooms occur in marine waters throughout the world and can be detrimental to the environment, human health, and marine life, and can result in severe economic impacts to tourist industries. The economic effects of red tide blooms can be particularly detrimental in ocean-bordering states such as Florida that rely heavily on revenue generated through tourism.

The causative organism of the Florida red tide is the dinoflagellate *Karenia brevis* (Davis), formerly known as *Gymnodinium breve* and *Ptychodiscus brevis*. Although found primarily in the Gulf of Mexico, *K. brevis* has been transported by ocean currents as far as the Atlantic seacoast. *K. brevis* blooms have been reported since the mid-1800's and have been accompanied by massive fish kills, poisonous clams, and associated respiratory irritation.

Red tide blooms are also known as harmful algal blooms (HAB) and produce toxic compounds known as phycotoxins, red tide toxins, or HAB toxins. *K. brevis* produces a suite of polyether neurotoxins called brevetoxins. Toxins produced by HAB affect public health by accumulation in seafood, by inhalation, and by skin contact. The Florida red tide organism has been implicated in extensive fish kills in the Gulf of Mexico, as well as in other animal mortalities. Red tide toxins were reported as the cause of death in over 150 endangered Florida manatees in 1996 and over 100 dolphins during 1999–2000 and again in 2004. The adverse effects of red tides on public health, marine life, the environment, and natural resources, are extensive.

Certain algal species are prevalent in different regions of the world and additional harmful species are being identified at a rapid pace, with as many as 100 species of toxic microalgae identified in the marine environment. The global increase in frequency and intensity of harmful algal blooms has led to more frequent incidence of seafood-borne illnesses and greater impacts on natural resources. The recent increase in number and intensity of HABs has raised concern that toxic phytoplankton species may be replacing nontoxic species. With increasing numbers of toxic species impacting aquatic organisms as well as public health, new and innovative techniques are necessary to control growth and mitigate the effects of these organisms. Considerable effort is being directed towards development and refinement of innovative techniques to meet increasing demands for protection of public health, aquaculture, and natural resources.

Ozone is a commonly used and powerful oxidizing agent for cleaning and purifying water. It is used extensively as a sanitizer in swimming pools, and for purification of drinking water and aquarium water housing fish, marine mammals, and other marine life. Ozone has been shown to be effective in inactivating crude toxins associated with dinoflagellate blooms, as well as in reducing the levels accumulated in shellfish (Blogoslawski, W. J., F. P. Thurberg, M. A. Dawson, and M. J. Beckage, 1975, "Field studies on ozone inactivation of a *Gymnodinium breve* toxin," Environmental Letters, 9(2):209–215, Blogoslawski, W. J., F. P. Thurberg, and M. A. Dawson, 1973, "Ozone inactivation of a *Gymnodinium breve* toxin," Water Research, 7:1701–1703). Ozone has been used to treat seawater in marine laboratories dependent upon a non-toxic source of natural seawater.

Typical methods for controlling growth of red tide organism using ozone, such as those currently employed by aquaria, effectively destroy red tide organisms and associated toxins. Existing methods, however, involve the use of very high ozone concentrations and are accompanied by many drawbacks, including high expense, human health hazards, and detrimental effects on aquatic species. In aquaria, over-ozonation of water sources is usually necessary in order to destroy high levels of toxins. These high levels of ozonation, and the by-products of oxidation, e.g., salts, are generally harmful to other marine species.

Others have described the use of ozone to kill red tide organism. For example, U.S. Pat. No. 6,235,206, the disclosure of which is incorporated herein by reference, discloses a method wherein ozone is injected directly into water containing red tide algae. However, the direct injection of ozone into a marine environment does not directly target the red tide blooms and the resulting uncontrolled or high levels of ozone and its by-products can be harmful to the environment and marine species. Therefore, the method requires monitoring of both ozone concentration and dissolved oxygen content in the water to prevent harm to marine life in the water. Also, the treated (i.e., ozonated) water can interchange continuously with harmful organism-containing water, leading to an inefficient and uncontrolled process. In addition, the method requires the transportation of elaborate equipment to the treatment site. U.S. Pat. No. 6,451,612, the disclosure of which is incorporated herein by reference, discloses a method for determining a level of ozone that should be used to treat water by measuring an initial content of oxidants in the water to be treated, and then taking a sample of the water to be treated and systematically inducing a calibrated solution of known ozone concentration therein and measuring the resulting oxidant concentration after a specified time. The appropriate concentration of ozone for treating the water is then arrived at using the oxidant concentration of the water sample after injecting with the calibrated solution. However, this method is time and labor intensive, and only addresses the determination of a level for ozonation, and does not provide a delivery method for that level.

Therefore, there exists a need for an efficient, effective and safe method for using ozone to control growth of red tide organisms while not harming other marine species.

BRIEF SUMMARY OF THE INVENTION

The method described in the present invention provides an effective means of utilizing ozone to safely control growth of the harmful organisms [e.g., the Florida red tide organism (*Karenia brevis* Davis)] without harming surrounding marine life or releasing harmful ozone into the environment.

In a first aspect, this invention provides a method for inactivating harmful organisms in water comprising providing ozonated seawater and applying the ozonated seawater to the harmful organisms, the ozone-treated seawater having a concentration of ozone or oxidants sufficient to inactivate the harmful organisms without harming other marine life present in the water. In an embodiment of the first aspect of the invention, the method further comprises storing the ozonated seawater prior to application of the ozonated seawater to the harmful organisms. In another embodiment of the first aspect of the invention, the ozone-treated seawater is injected under the surface of the water to be treated such that little or no ozone is released into the atmosphere.

BRIEF DESCRIPTION OF THE DRAWINGS

The invention is illustrated by the following drawings.

DETAILED DESCRIPTION OF THE INVENTION

The present invention describes a method for controlling growth of the red tide organism utilizing only very low concentrations of ozone. This method utilizes direct application of ozonated seawater to dinoflagellate blooms, thus minimizing adverse effects of ozone on the environment, human health, and other marine life typically associated with ozonation. The present invention takes advantage of the fact that the red tide organism is much more susceptible to ozone and ozone-derived oxidants than are most other organisms, which contributes to the effectiveness and enhanced safety of this method compared to other methods.

Red tide blooms are initially small in size when they originate. With appropriate wind, tide, and current conditions, however, the blooms move and rapidly increase in size. Locating red tide blooms when they are small and treating these small blooms with ozonated seawater before they grow in size can effectively control growth of the bloom.

The present invention includes a method that includes the treatment of seawater prior to application to harmful organisms, wherein the ozonated seawater itself is applied to the organisms, rather than directly applying ozone to the organisms. Advantageously, previously ozonated seawater can be applied in a variety of ways, e.g., by injecting it under the surface of water containing harmful organisms, or by spraying directly onto the surface of a bloom in an environmental setting, such as a canal, a harbor, or a gulf. Using this method, ozone-treated seawater is very stable, can be stored, and is still effective at low ozone concentrations up to two weeks later. The stability of the ozone-treated seawater is particularly advantageous because treated seawater can be stored in a tank on land, transported to the location where it is needed, and subsequently applied (e.g., injected, pumped or sprayed) into canals, or other bodies of water, where red tide blooms or other harmful organisms have accumulated.

Figure 1:
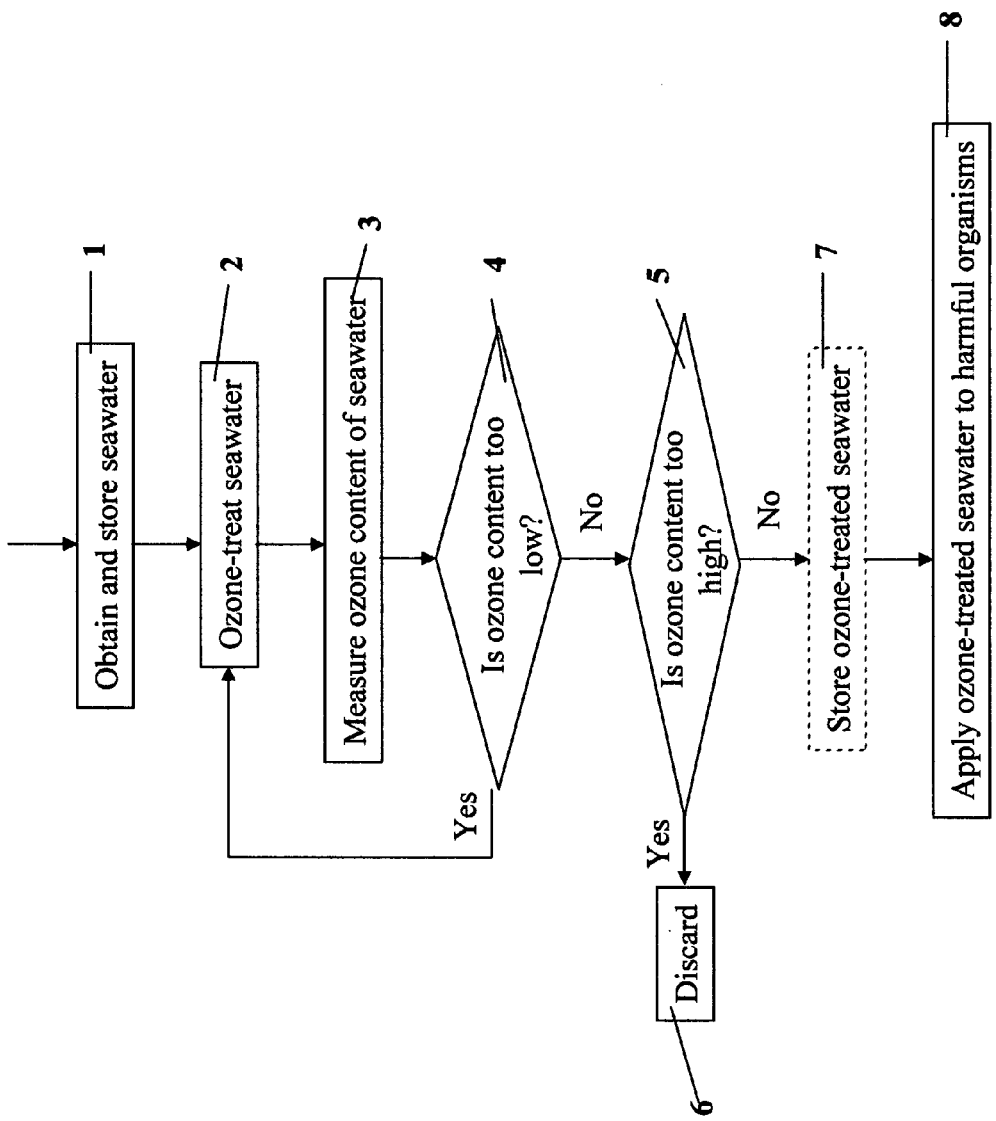
FIG. 1 is a flowchart showing a method of the present invention for controlling growth of harmful organisms.

The present invention includes a method for effectively inactivating red tide algae, harmful dinoflagellates, and their associated toxins, without resulting in adverse effects on the environment, human health, or marine life. The method is illustrated in FIG. 1 by means of a flow chart. The method comprises obtaining and storing a source of seawater that does not contain significant populations of harmful organisms, such as filtered seawater or seawater obtained from a natural source (e.g., a bay, pass, or channel) (step 1). The stored seawater is then ozone-treated (step 2) (i.e., ozonated) by dissolving ozone therein using any suitable means (e.g., bubbling ozone into the seawater using bubble columns, or venturi valves, or counter current flow reactors, etc.). The seawater is then monitored for low ozone content (preferably in the range 30 ppb–2 ppm) (step 3). The ozone can exist in seawater as a variety of species, e.g., as dissolved ozone, or as hypohalite species such as hypobromite, or as hypohalous species such as hypobromous acid, or as other ozone-derived oxidants. The concentration of the ozone in the seawater can be measured using any suitable technique, e.g., by ultraviolet spectroscopy, titration, or using commercially available ozone test kits, such as those available from CHEMetrics, Inc. If the concentration of the ozone in the seawater is lower than the desired range (box 4), then it can be further ozonated (step 2). If the concentration of the ozone in the seawater is too high (box 5), then it can be discarded (box 6). If the concentration of the ozone in the seawater is in the desired range, the ozonated seawater can optionally be stored (optional step 7, as indicated by dotted lines), e.g. in a vessel suitable for transport. Alternatively, the seawater can be treated with ozone with a monitor feedback to make sure the ozone concentration is within the desired range. The ozonated seawater can then be applied directly to harmful organisms, such as algae blooms (e.g., red tide or other dinoflagellate blooms). The ozonated seawater can be stored (e.g., in a tank or vessel) and will be effective for extended periods (e.g., several weeks) and reapplied to the same algae blooms if necessary, or to other algae blooms. If the ozonated seawater is stored, then the ozone content can be measured prior to use.

The method described herein allows for the ozonation of the seawater in a controlled setting (e.g., a laboratory or water treatment plant) and then transporting only the ozonated seawater to environmental sites, rather than equipment and facilities of directly applying ozone to the environmental sites. The controlled environment of the present invention allows for the capture and control of excess ozone gas, as well as by-products of the ozonation process, in the controlled setting such that they will not be released into the environment.

Figure 2:
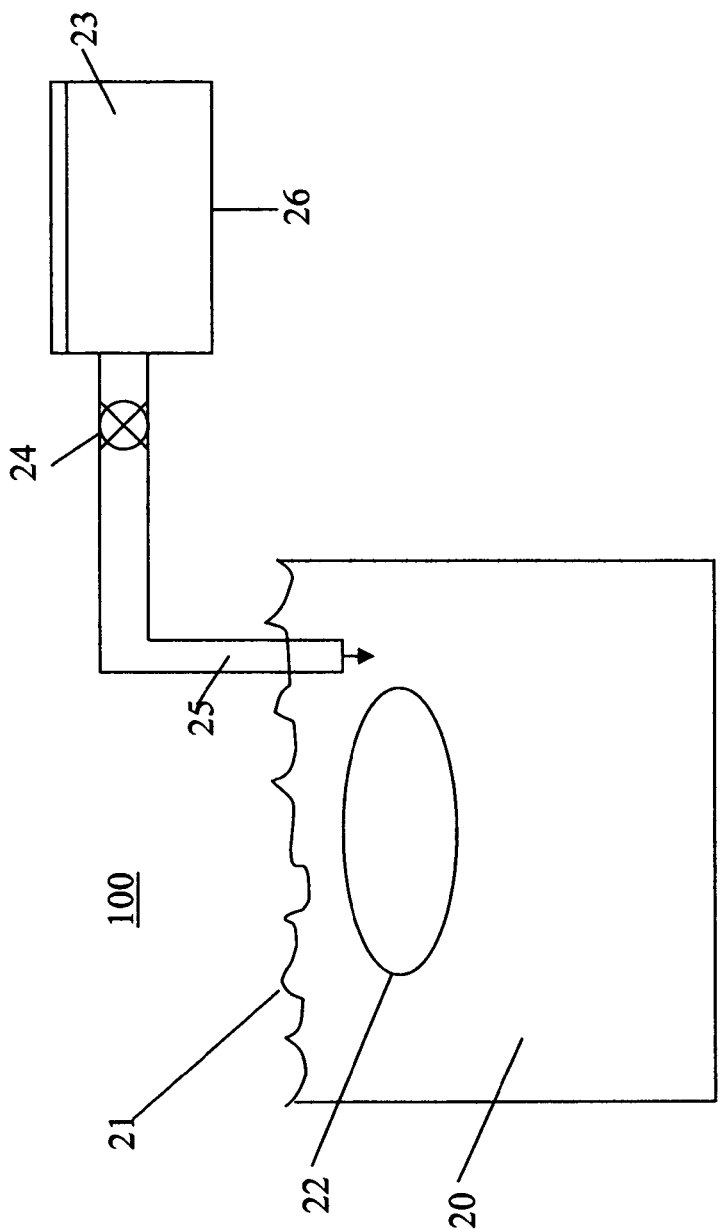
FIG. 2 is a schematic diagram illustrating an embodiment of a method of the present invention in which ozone-treated seawater is applied under the surface of water containing harmful organisms.
Figure 3:
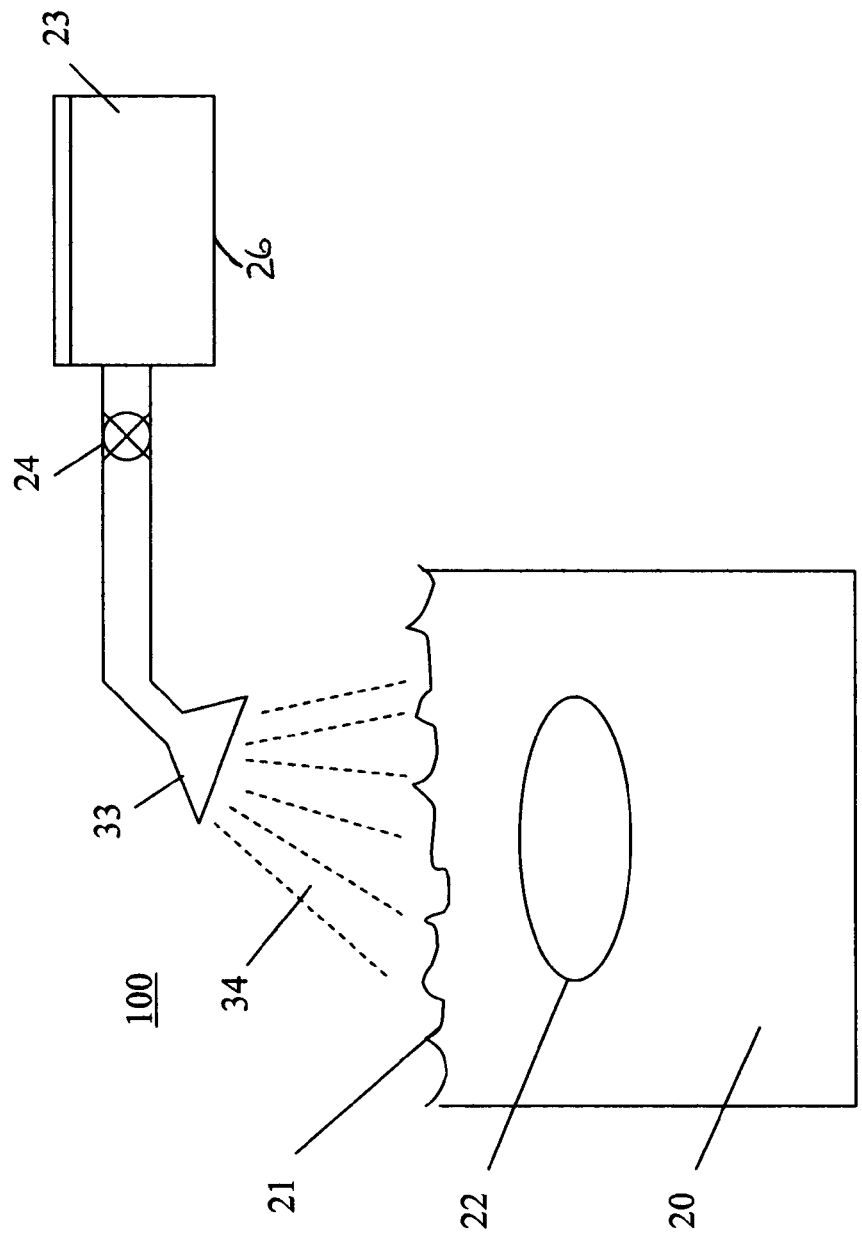
FIG. 3 is a schematic diagram illustrating an embodiment of a method of the present invention in which ozone-treated seawater is applied to the surface of water containing harmful organisms.

FIGS. 2 and 3 illustrate embodiments of the present invention. In FIG. 2, a body of water 20 having a surface 21 and open to atmosphere 100 contains a population of harmful organisms 22. Ozone-treated seawater 23 is provided in a vessel 26. The ozonated seawater is then applied under surface 21 via port 25 and valve 24, e.g., by injecting, pumping or any suitable means. By applying the ozonated seawater under the surface 21, there is virtually no ozone emitted into the atmosphere 100. Therefore, the ozone is applied only where desired (i.e., the water containing the harmful organisms) with low and well-controlled concentrations. In FIG. 3, the ozone treated seawater 23 is applied to the water surface 21 directly over the site of the population of harmful organisms 22. The treated seawater 23 is contained in vessel 26 and is applied in streams 34 to the water surface 21 via port 33 and valve 24, e.g., by spraying, pumping, or any other suitable means.

The method allows a well-controlled targeted delivery of low concentration ozone (which can exist for example as secondary oxidants or as hypobromate) to harmful species without endangering surrounding marine life. As shown in the literature (Grguric, G., J. H. Trefry, and J. J. Keaffaber, 1994, Ozonation products of bromine and chlorine in seawater aquaria, Water Research, 28(5):1087–1094), ozone quickly reacts in seawater to form stable hypobromous acid/hypobromite anion oxidants. Even though bromine occurs at much lower concentration in seawater than chlorine, its reaction rate with ozone is much faster. The stability of the ozonated seawater (e.g., including hypobromous acid/hypobromite anion oxidants) allows for generation of treated seawater off-site, storage, and transportation for environmental application directly at the bloom location. It does not require the transportation of ozone-generation equipment, ozone-injecting equipment or ozone monitoring equipment to the bloom location. The method allows for direct application of ozonated seawater to harmful organism-affected open water environments, such as channels, bays, harbors, estuaries, etc. The method also allows for direct application of ozonated seawater to harmful organism-affected enclosed water environments, such as lagoons, tanks, aquaria, ponds, etc.

The practice of this invention can be further understood by reference to the following examples, which are provide by way of illustration and not of limitation.

EXAMPLES 1–4

For Examples 1–4 below, a stock culture of K brevis was grown and maintained in NH-15 media at 25° C. on a 12 hour light cycle. Inactivation of *K. brevis* was determined using a Fisher-Brad cell counting slide in conjunction with light microscopy. The effect of ozonated seawater on red tide organisms was evaluated by observing cells after treatment and documenting reduced motility. The treated cultures were then inoculated back into fresh culture medium and observed over the course of several weeks to evaluate growth. Ozone concentrations in seawater were measured using a CHEMets Test Kit K-7402 "Ozone CHEMets," available from CHEMetrics, Inc., Calverton, Va. Alternatively, ozone concentrations can be measured using titration, ultraviolet spectroscopy, or any other suitable method. Results of Examples 1–4 are summarized in Table 1.

Toxicity tests were performed to assess acute and chronic health effects on a vertebrate (*Menidia beryllina*) and an invertebrate (*Mysidopsis bahia*) at the levels of ozonated seawater found to be effective against red tide. Concentrations used (0.5 ppm and less) exibited "No Observed Effect Concentration" (NOEC) on both the fish (vertebrate) and the shrimp (invertebrate). Indeed, both species actually grew better with the treatment than the controls did.

EXAMPLE 1

Seawater containing 30 ppb ozone was applied to a sample of seawater containing $2\times10^6$ red tide cells/liter in a laboratory environment. Three days after treatment, the red tide cells in the sample were effectively reduced to $2\times10^5$ cells/liter, with red tide cell concentration remaining at these low levels and no regrowth of red tide organisms was observed.

EXAMPLE 2

Seawater containing 50 ppb ozone was applied to blooming culture of red tide cells in a laboratory environment. Over a period of two days, exposure of red tide blooms to this level of ozonated seawater resulted in an approximately 75% reduction. No regrowth of red tide cell organisms was observed.

EXAMPLE 3

Seawater containing 0.5 ppm ozone was applied to a blooming culture of red tide in a laboratory environment. Complete destruction of all red tide organisms was observed in less than 10 minutes and no regrowth of red tide organisms was observed.

EXAMPLE 4

Seawater containing 2 ppm ozone was applied to a blooming culture of red tide cells in a laboratory environment. Complete destruction of all red tide organisms was observed instantaneously and no regrowth of red tide organisms was observed.

TABLE 1

Summary of Results for Examples 1–4.

| Example | Ozone Concentration in Seawater | Percent reduction of red tide cells/time |
| --- | --- | --- |
| 1 | 30 ppb | 90%/3 days |
| 2 | 50 ppb | 75%/2 days |
| 3 | 0.5 ppm | 100%/10 minutes |
| 4 | 2 ppm | 100%/instantaneous |

EXAMPLE 5

A 2% mixture of ozone in air was injected into a 20,000 gallon sample (pool) of Gulf of Mexico water under the surface (dissolved via venturi nozzle into a recirculation loop of the pool, wherein 40 scfh of gas was injected). After 3 hours, no off-gassing of ozone was observed by an air monitor that was calibrated to a sensitivity of 0.06 ppm ozone in air. This Gulf of Mexico water sample had contained no red tide algae but was typical in other constituents (dissolved organics, oxygen, nutrients, etc.). This example illustrates that the prior ozonation of seawater results in a stable ozonated medium that does not result in significant addition of ozone to the atmosphere.

Pre-treating seawater with ozone was sufficient to control growth of the red tide organism, however, pre-treatment may not lead to efficient destruction of the toxins, and ozone must come directly in contact with toxins in order for toxins to be efficiently inactivated. These results indicate that hypobromous acid or hypobromite oxidants formed during ozonation of seawater may not be powerful enough to destroy the toxin. Studies have shown that bubbling a 2% mixture of ozone in air can achieve reduction of toxin content in samples by 50% in 10 seconds and by 95% in 30 seconds.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extend appropriate, in the context of another figure, in combination with another feature, or in the invention in general.

It will be understood that the above-described arrangements of apparatus and the methods therefrom are merely illustrative of applications of the principles or this invention and many other embodiments and modifications may be made without departing from the spirit and scope of the invention as defined in the claims.

What is claimed is:

1. A method for inactivating harmful organisms in water, the water having a surface, comprising:
   providing ozone-treated seawater; and
   applying the ozone-treated seawater to the harmful organisms;
   the ozone-treated seawater having a concentration of ozone sufficient to inactivate the harmful organisms without harming other marine life in the water.

2. The method of claim 1, wherein the concentration of ozone in the ozone-treated seawater is between 2 ppm and 30 ppb.

3. The method of claim 1, wherein the concentration of ozone in the ozone-treated seawater is between 1 ppm and 500 ppb.

4. The method of claim 1, wherein the ozone-treated seawater is generated by bubbling ozone-containing gas through seawater.

5. The method of claim 1, wherein the ozone-treated seawater is generated by injection of ozone-containing gas into the seawater using a valve.

6. The method of claim 1, wherein the seawater is filtered prior to being ozone-treated.

7. The method of claim 1, comprising storing the ozone-treated seawater in a vessel.

8. The method of claim 7, comprising transporting the vessel containing the ozone-treated seawater to a site having harmful organisms in water.

9. The method of claim 1, wherein the harmful organisms comprise algae.

10. The method of claim 9, wherein the algae comprises red tide blooms.

11. The method of claim 1, wherein the harmful organisms comprise bacteria or viruses.

12. The method of claim 1, wherein the water comprises an open water source.

13. The method of claim 1, wherein the water comprises an enclosed water source.

14. The method of claim 1, wherein the harmful organisms comprise dinoflagellates.

15. The method of claim 1, wherein the application of the ozone-treated seawater to the harmful organisms comprises injecting the ozone-treated seawater underneath the surface of the water.

16. The method of claim 1, wherein the application of the ozone-treated seawater to harmful organisms comprises spraying onto the surface of water comprising the harmful organism.

17. The method of claim 1, wherein the ozone-treated seawater comprises hypobromous acid or hypobromite anion oxidants.

18. The method of claim 1, wherein the harmful organisms comprise brevetoxins or phycotyoxins.

* * * * *